United States Patent [19]
King

[11] Patent Number: 5,241,756
[45] Date of Patent: Sep. 7, 1993

[54] PRECISION MEASURING DEVICE AND METHOD OF USE

[76] Inventor: Thomas S. King, 2615 Oberlin Dr., Durham, N.C. 27705

[21] Appl. No.: 932,517

[22] Filed: Aug. 20, 1992

[51] Int. Cl.[5] .................. G01B 5/20; G01B 3/14; G01B 3/08
[52] U.S. Cl. .................. 33/561.1; 33/464; 33/516; 33/644
[58] Field of Search .............. 33/561.1, 464, 427, 33/428, 452, 516, 483, 484, 485, 644, 677, 679

[56] References Cited

U.S. PATENT DOCUMENTS

| | | | |
|---|---|---|---|
| 1,215,441 | 2/1917 | Walker | 33/452 |
| 1,463,375 | 7/1923 | Shields | 33/485 |
| 1,946,377 | 2/1934 | Wynd . | |
| 2,028,052 | 1/1936 | Easterly | 33/427 |
| 2,334,385 | 2/1942 | Cooper . | |
| 3,145,475 | 8/1964 | Alford . | |
| 3,261,102 | 7/1966 | Stedman | 33/464 |
| 3,309,775 | 3/1967 | Viergegge | 33/464 |
| 3,635,396 | 1/1972 | Palfi | 33/464 |
| 3,861,049 | 1/1975 | Muller . | |
| 4,495,709 | 1/1985 | Mainenti | 33/485 |
| 4,566,200 | 1/1986 | Brady et al. | 33/452 |

Primary Examiner—William A. Cuchlinski, Jr.
Assistant Examiner—C. W. Fulton
Attorney, Agent, or Firm—Henderson & Sturm

[57] ABSTRACT

A measuring device (10) and method for duplicating an irregular shape (200) onto a sheet of material (300) by employing the device (10) in combination with a sheet of paper (100) and a conventional marking implement; to form traced lines (101) on the sheet of paper (100) in response to measurements taken from the irregular shape (200); transferring the sheet of paper (100) to the sheet of material (300); using the traced lines (101) and measuring device (10) to make marks (301) on the sheet of material (300); and, then severing the sheet of material (300) in line segments between adjacent marks (301).

12 Claims, 3 Drawing Sheets

PRECISION MEASURING DEVICE AND METHOD OF USE

TECHNICAL FIELD

The present invention relates to the field of measuring devices in general, and in particular to a new type of measuring device to accurately produce odd shaped inserts plus the method of employing this new type of device.

BACKGROUND ART

This invention was the subject matter of Document Disclosure Program Registration No. 276,739 which was filed in the United States Patent and Trademark Office on Mar. 18, 1992.

As can be seen by reference to the following U.S. Pat. Nos. 3,861,049; 1,946,377; 2,334,385; and 3,145,475; the prior are is replete with myriad and diverse measuring devices used to duplicate irregular shapes.

While all of the aforementioned prior art constructions are more than adequate for the basic purpose and function for which they have been specifically designed, these patented devices are uniformly deficient with regard to the fact that they employ far too many structural elements to obtain a duplicate of an irregular shape, particularly when that shape is comprised of a plurality of interconnected straight line surfaces disposed at an angle relative to one another.

As a consequence of the foregoing situation, there has existed a longstanding need particularly among craftsmen who are required to duplicate irregular straight line shapes, such as for counter top inserts; for a new type of measuring device and method of use which will greatly simplify their task in a quick and efficient manner; and, the provision of such a construction is a stated objective of the present invention.

DISCLOSURE OF THE INVENTION

Briefly stated, the measuring device that forms the basis of the present invention comprises a telescoping measuring device which when used with a pencil and piece of paper in a proscribed manner is capable of producing an exact duplication of an irregular shape composed of generally straight line surfaces.

The measuring device of this invention comprises at least two adjustable telescoping members; wherein, one of the telescoping members is provided with a pointer/marker element.

As will be explained in greater detail further on in the specification, a generally rectangular piece of paper and a marking implement such as a pencil or pen is required to practice this invention to duplicate an irregular configuration.

In one version of the preferred embodiment one edge of the sheet of paper is positioned along a selected edge of a straight edged irregular shape. At this point, the measuring device is adjusted to a length; wherein, a certain location on the measuring device will rest on top of the paper when the pointer/marker element contacts the junctures between the adjacent angled edges of the irregular shape.

Then by outlining one edge of the measuring device at each location that the device rests on the paper; and, then transferring the piece of paper so that the same edge of the paper that abutted the straight edge of the irregular shape rests on a straight edge of a sheet of material upon which the irregular shape is to be duplicated. It is then a simple matter to realign the measuring device, so that all of the angle junctures can be reproduced, and the material severed along straight lines between the points reproduced on the material to create the duplication.

In another version of the preferred embodiment, the sheet of paper is placed wholly within an irregular shape having curved edges; wherein, a series of sequential markings are made along segments of the curved irregular shape; such that a smooth continuous line can be traced through the duplicated series of markings on a sheet of material, to reproduce the curved irregular shape as will be explained in greater detail further on in the specification.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 2:
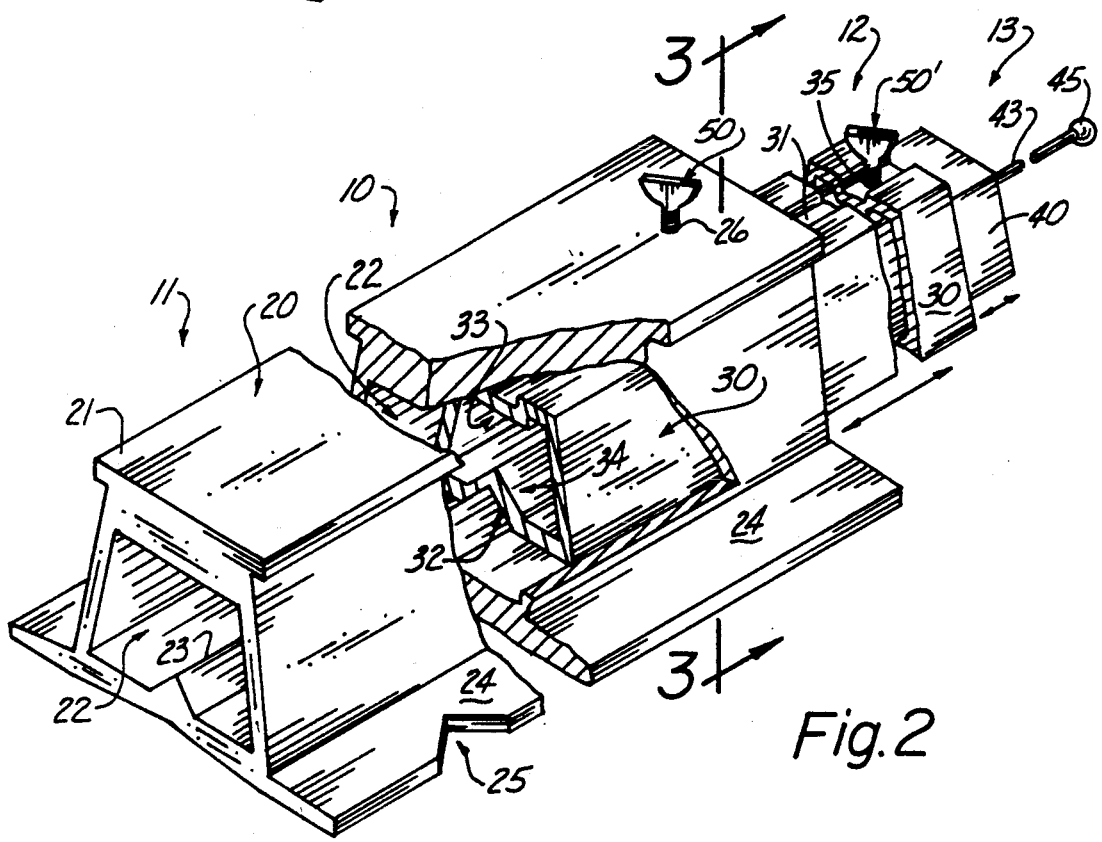
FIG. 2 is an isolated perspective view of the measuring device.

As can be seen by reference to the drawings, and in particular to FIG. 2, the measuring device that forms the basis of the present invention is designated generally by the reference numeral (10). The measuring device (10) comprises in general a base unit (11) an extension unit (12) and a pointer/marker unit (13). These units will now be described in seriatim fashion.

Figure 3:
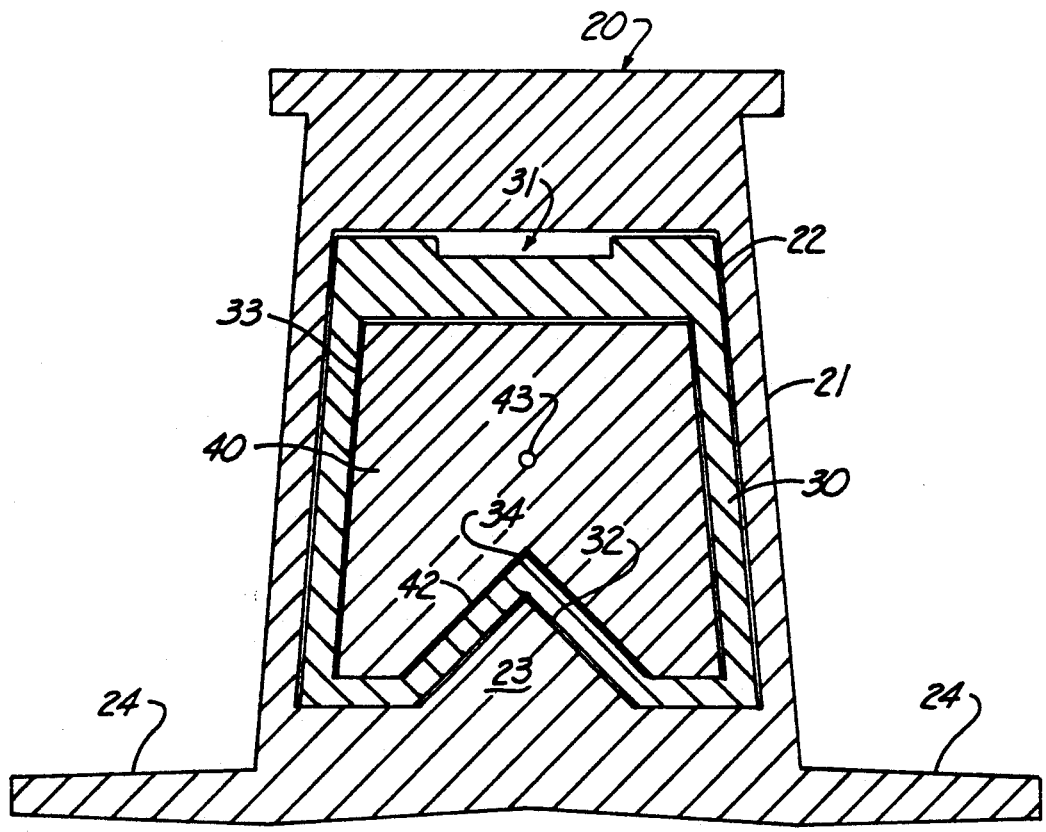
FIG. 3 is a cross-sectional view of the device taken through line 3—3 of FIG. 2.
Figure 4:
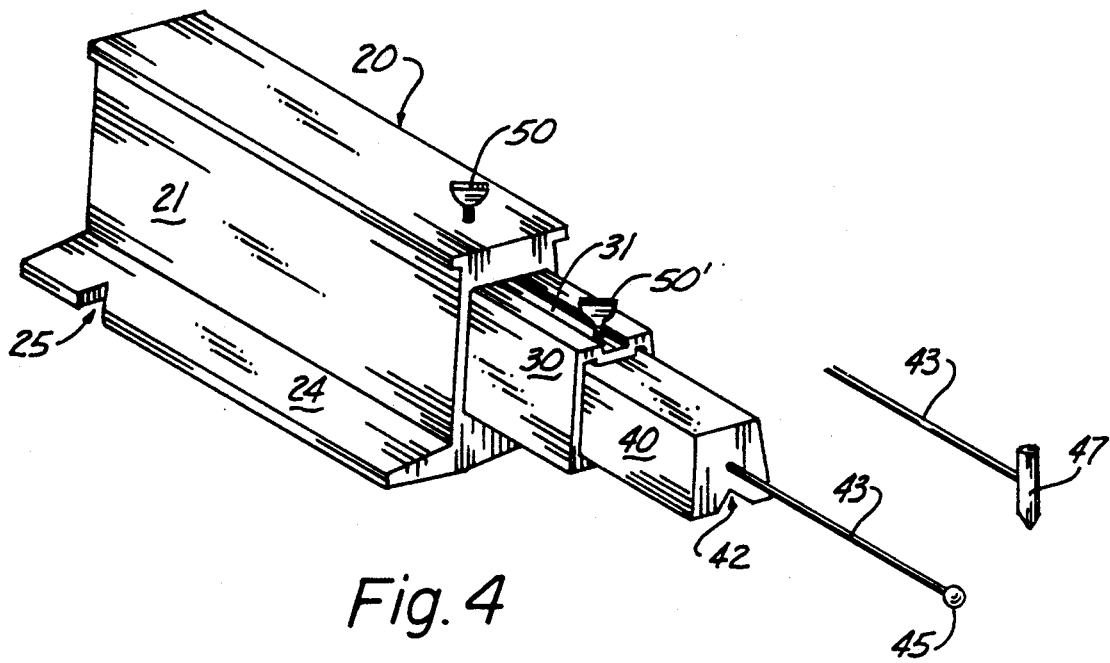
FIG. 4 is an isolated front end perspective view of the measuring device.

As shown in FIGS. 2 through 4 the base unit (11) comprises an elongated generally rigid base member (20) having an enlarged hollow central portion (21) provided with a first elongated contoured longitudinal bore (22); wherein, the interior of the bore (22) is further provided with a first raised guide rail (23) whose purpose and function will be described further on in the specification.

In addition, the bottom of the base member (20) is provided with outwardly projecting straight edged flanges (24) which extend along the entire length of both sides of the base member (20); wherein, each of the flanges (24) is provided with a notch (25) located proximate to, but spaced from one end of the base member (20).

Furthermore, the top surface of the base member (20) is provided with a discrete aperture (26) which intersects the longitudinal bore (22) of the central portion (21) of the base member (20); and, is further dimensioned to receive a first locking member (50) whose purpose and function will be described further on in the specification.

Still referring to FIGS. 2 through 4, it can be seen that the extension unit (12) comprises an elongated, hollow, generally rigid extension member (30) which is dimensioned to be slideably received within the longitudinal bore (22) of the base member (20). In addition, the upper portion of the extension member (30) is provided with a longitudinal recess (31); the bottom portion of the extension member (30) is provided with groove (32), dimensioned to slideably engage the guide rail (23) in the interior of the base member (20); and, the hollow interior of the extension member (30) defines a second contoured longitudinal bore (33) having a second raised guide rail (34), whose purpose and function will be described presently.

As can best be seen by reference to FIG. 2, the outboard end of the longitudinal recess (31) of the extension member (30) is provided with a discrete aperture (35) which intersects with the longitudinal bore (33) in the extension member (30) and is further dimensioned to receive a second locking member (50') which will be described presently.

As shown in FIGS. 2 through 4, the pointer/marker unit (13) comprises a generally rigid carrier member (40) having a recess (42) formed in its lower surface; wherein, the carrier member (40) is dimensioned to be slideably received in the bore (33) of the extension member (30) and the recess (42) is dimensioned to slideably engage the raised guide rail (34) in the longitudinal bore (33).

In addition as shown specifically in FIG. 4, the outboard end of the carrier member (40) is further provided with an elongated generally flexible rod element (43) which is optionally provided on its outboard end with a spherical pointer element (45) or a market element (47).

Still referring to FIGS. 2 through 4, it can be seen that the extension member (30) is telescopically received within the base member (20); wherein, the extension member (30) may be captively engaged relative to the base member (20) by actuation of the first locking member (50). In addition, the carrier member (40) is telescopically received within the extension member (30); wherein, the carrier member (40) may be captively engaged within the extension member (30) by tee second locking member (50').

As a consequence of the foregoing cooperation the measuring device (10) may be selectively lengthened or shortened to a specific dimension in order to produce the duplication of either an irregular straight or curved shape or a combination thereof as will be explained next.

Figure 1:
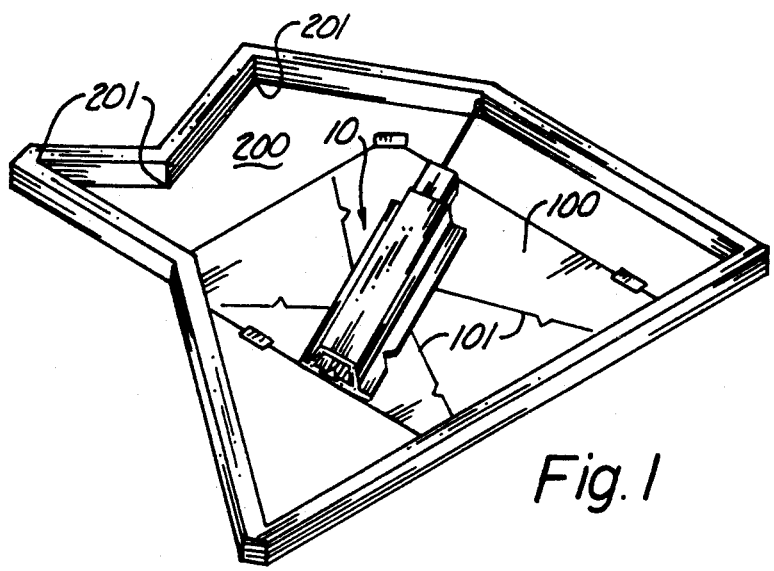
FIG. 1 is a perspective view of the measuring device being employed in its intended manner.
Figure 5:
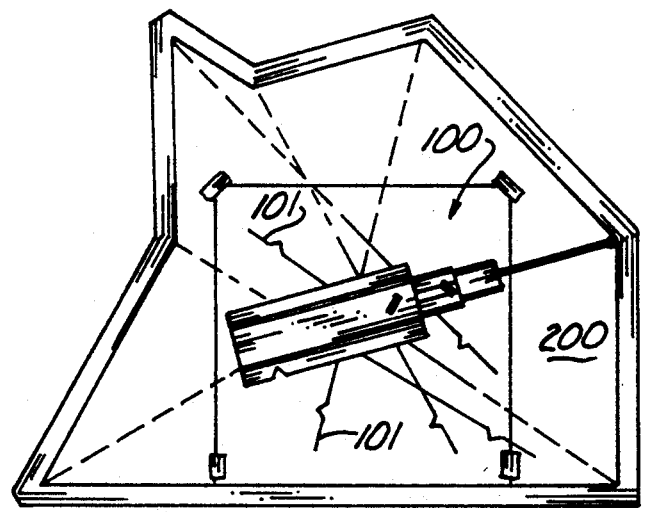
FIG. 5 is a top plan view of the measuring device being employed to measure an irregular shape; and, FIG. 6 is a top plan view of the measuring device being employed to reproduce the irregular shape on a separate sheet of material; and, FIG. 7 is a plot of a curved irregular shape that can be duplicated by the measuring device of this invention.

As can best be seen by reference to FIGS. 1 and 5, in one version of the preferred method of use the measuring device (10) is first employed in conjunction with a sheet of paper (100) and a conventional marking implement (not shown) such as a pen or pencil, to draw reference lines (101) on the sheet of paper (100) in response to the registration of the measuring device with selected points (201) on an irregular straight sided shape (200).

Figure 6:
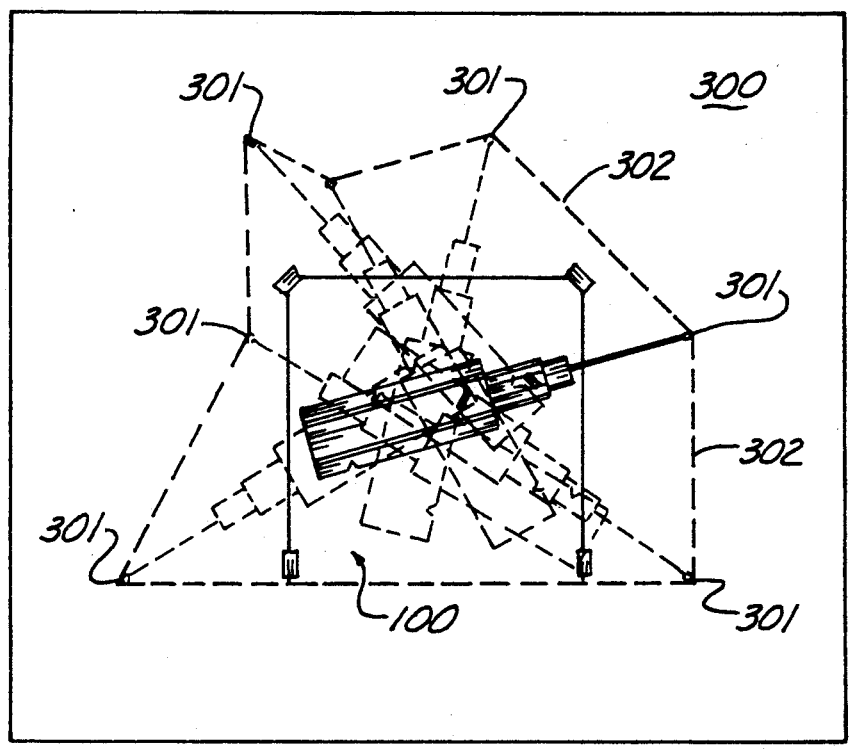

In the preferred method of employing the measuring device (10) illustrated in FIGS. 1, 5 and 6, one edge of the sheet of paper (100) is aligned in an abutting relationship with one edge of the irregular shape (200). At this juncture the length of the measuring device is adjusted such that when the outboard end of the pointer/marker unit (13) is aligned sequentially with all of the junctures (201) of the angled straight edge surfaces which comprise the irregular shape (200) at least one notch (25) on the flanges (24) of the base member (20) will overlie a portion of the sheet of paper (100).

Then as the registry between each of the angled junctures (201) of the irregular shape (200) and the pointer/marker unit (13) as well as at least one of the notches (25) on the base member (20) with the sheet of paper (100) is accomplished, the conventional marker is used to trace a line (101) onto the sheet of paper (100); wherein, the traced line (101) includes the notched portion (25) of the base member (20).

Once all of the lines (101) have been transcribed onto the sheet of paper (100), the sheet of paper (100) is transferred onto a sheet of material (300) upon which the irregular shape (200) will be duplicated. It should also be noted at this juncture, that while FIG. 6 shows the sheet of paper (100) centrally disposed on the sheet of material (300) this is for illustration purposes only; and, as a practical matter the same edge of the sheet of paper (100) which abutted one of the straight edges of the irregular shape (200) would be placed in an abutting relationship with one of the straight edges of the sheet of material (300) in order not to unnecessarily waste any of the material (2300).

Once the sheet of paper (100) is aligned on the sheet of material (300) the measuring device (10) is then placed on the sheet of paper (100) so that the traced lines (101) coincide with the notched edge of the base member (20). Once the traced line (101) registers with the notched edge of the base member (20), the outboard end of the pointer/marker unit (13) is used as a reference point for the placement of a mark (301) on the surface of the sheet of material (300).

Then, when all of the marks (301) have been made on the sheet of material (300) a straight line segment (302) is drawn between adjacent marks (301) to form the exact outline of the irregular shape (200); whereupon, any conventional severing means (not shown) such as a knife, scissors, power saw etc can be employed to sever the sheet of material (300) along the straight line segments (302) to form an exact duplicate of the irregular shape (200).

Figure 7:
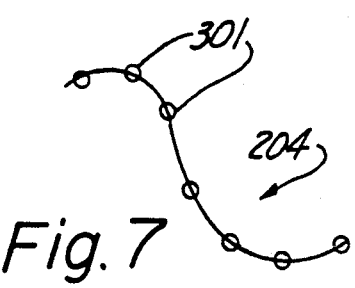

In another version of the preferred method of use shown in FIG. 7, the measuring device (10) can be used to reproduce a curved irregular shape (204) on a sheet of material (300) by placing a sheet of paper (100) at a spaced location from the edge of the curved irregular shape (204) and then trasncribing a series of sequential marks on the sheet of paper in accordance with the position of the notched portion (25) of the base member (20) as the free end of the pointer (43) registers with sequential locations on the edge of irregular curved shape (204).

Then the sheet of paper (100) is transferred to a sheet of material (300); wherein, the process is reversed to produce a plurality of marks (301) which are joined together by a smooth continuous line to reproduce the irregular curved shape (204)

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A measuring device for use with a sheet of paper and a conventional marking implement for duplicating an irregular straight sided shape onto a sheet of material; wherein, the measuring device comprises:
   a first generally elongated hollow member having a bottom portion provided with at least one outwardly projecting straight edged flange having a notch formed therein;
   a second member slideably received relative to said first member in a telescoping relationship; wherein, said second member has an outboard end equipped with an elongated rod; wherein, said elongated rod has an outboard end provided with a pointer element; and
   means for captively engaging said second member relative to said first member.

2. The measuring device as in claim 1; further comprising:
   an elongated generally hollow extension member disposed intermediate said first member and said second member.

3. The measuring device as in claim 2; wherein, said extension member is slideably received within said first member; and, said second member is slideably received within said extension member.

4. The measuring device as in claim 3, wherein, the first member is provided with locking means for captively engaging the extension member; and, the extension member is provided with locking means for captively engaging said second member.

5. A method of employing an adjustable length measuring device having a straight edged side provided with a notch in combination with a sheet of paper and a conventional marking implement to measure and duplicate an irregular straight edged shape onto a sheet of material comprising the steps of:
   a) aligning one edge of the sheet of paper with one straight edge of the irregular shape;
   b) adjusting the length of the measuring device such that when one end of the measuring device is aligned with any juncture between adjacent straight edges of the irregular shape the notch on the measuring device will rest on the sheet of paper; and,
   c) employing the conventional marking implement to trace a line onto the sheet of paper along the straight edge and notch of the measuring device; wherein, each traced line coincides with one of the junctures between adjacent straight edges on the irregular shape.

6. The method as in claim 5 further comprising the steps of:
   d) transferring the sheet of paper bearing the traced lines to said sheet of material;
   e) aligning the straight edge and notch of the measuring device in a sequential fashion with each of the traced lines on the sheet of paper;
   f) using one end of the measuring device as a reference point for placing a mark on the sheet of material at each alignment of the measuring device with the traced lines;
   g) drawing straight line segments on the sheet of material between adjacent marks; and,
   h) using conventional severing means to sever the sheet of material along the drawn straight line segments to duplicate the irregular shape.

7. A method of employing an adjustable length measuring device having a straight edged side provided with a notch in combination with a sheet of paper and a conventional marking implement to measure and duplicate an irregular shape onto a sheet of material comprising the steps of:
   a) positioning a sheet of paper on the irregular shape;
   b) adjusting the length of the measuring device such that when one end of the measuring device is aligned any point on the periphery of the irregular shape the notch on the measuring device will rest on the sheet of paper; and,
   c) employing the conventional marking implement to trace a line onto the sheet of paper along the straight edge and notch of the measuring device; wherein, each traced line coincides with one of the peripheral points on the irregular shape.

8. The method as in claim 7 further comprising the steps of:
   d) transferring the sheet of paper bearing the traced lines to said sheet of material;
   e) aligning the straight edge and notch of the measuring device in a sequential fashion with each of the traced lines on the sheet of paper;
   f) using one end of the measuring device as a reference point for placing a mark on the sheet of material at each alignment of the measuring device with the traced lines;
   g) drawing line segments on the sheet of material between adjacent marks; and,
   h) using conventional severing means to sever the sheet of material along the drawn line segments to duplicate the irregular shape.

9. A measuring device for use with a sheet of paper and a conventional marking implement for duplicating an irregular straight sided shape onto a sheet of material; wherein, the measuring device comprises:
   a first generally elongated hollow member having a bottom portion provided with at least one outwardly projecting straight edged flange having a notch formed therein;
   a second member slideably received relative to said first member in a telescoping relationship; wherein, said second member has an outboard and equipped with an elongated rod; wherein, said elongated rod has an outboard end provided with a marker element; and
   means for captively engaging said second member relative to said first member.

10. The measuring device as in claim 9, further comprising:
    an elongated generally hollow extrusion member disposed intermediate said first member and said second member.

11. The measuring device as in claim 10; wherein, said extension member is slideably received within said first member; and, second member is slideably received within said extension member.

12. The measuring device as in claim 11; wherein, the first member is provided with locking means for captively engaging the extension member; and, the extension member is provided with locking means for captively engaging said second member.

* * * * *